US006190760B1

United States Patent
Nagai et al.

(10) Patent No.: US 6,190,760 B1
(45) Date of Patent: Feb. 20, 2001

(54) BIAXIALLY ORIENTED POLYPROPYLENE FILM TO BE METALLIZED A METALLIZED BIAXIALLY ORIENTED POLYPROPYLENE FILM AND A LAMINATE FORMED BY USING IT

(75) Inventors: Itsuo Nagai; Shigeru Tanaka, both of Shiga (JP)

(73) Assignee: Toray Industries, Inc. (JP)

( * ) Notice: Under 35 U.S.C. 154(b), the term of this patent shall be extended for 0 days.

(21) Appl. No.: 09/205,562

(22) Filed: Dec. 4, 1998

(30) Foreign Application Priority Data

Dec. 26, 1997 (JP) .................................................. 9-358954
Jan. 9, 1998 (JP) ................................................. 10-003227

(51) Int. Cl.⁷ ..................................................... B32B 27/08
(52) U.S. Cl. ......................... 428/213; 428/461; 428/515; 428/516; 428/910
(58) Field of Search .................................... 428/515, 516, 428/409, 910, 461, 213

(56) References Cited

U.S. PATENT DOCUMENTS

| 4,522,982 | * | 6/1985 | Ewen ................................. 526/240 |
| 5,595,827 | * | 1/1997 | Yamada et al. ...................... 428/516 |
| 5,998,039 | * | 12/1999 | Tanizaki et al. ..................... 428/516 |
| 6,013,353 | * | 1/2000 | Touhsaent ............................ 428/203 |

* cited by examiner

*Primary Examiner*—Paul Thibodeau
*Assistant Examiner*—Monique Jackson
(74) *Attorney, Agent, or Firm*—Austin R. Miller

(57) ABSTRACT

A biaxially oriented polypropylene film to be metallized, including a surface layer made of a polypropylene resin with the endothermic main peak by crystal fusion in a range of 155 to 163° C. and with a heat of crystal fusion of 20 to 90 J/g, being laminated layer at least on one side of the base layer made of isotactic polypropylene; and the wetting tension of the surface layer, being 33 to 55 mN/m. A metallized biaxially oriented polypropylene film, including a thin metallic film, being laminated on the surface layer of said biaxially oriented polypropylene film to be metallized. A laminate obtained by using said metallized biaxially oriented polypropylene film.

23 Claims, No Drawings

BIAXIALLY ORIENTED POLYPROPYLENE FILM TO BE METALLIZED A METALLIZED BIAXIALLY ORIENTED POLYPROPYLENE FILM AND A LAMINATE FORMED BY USING IT

BACKGROUND OF THE INVENTION

1. Field of the Invention

The present invention relates to a biaxially oriented polypropylene film to be metallized, and a metallized biaxially oriented polypropylene film, and a laminate formed by using it.

In more detail, the present invention relates to a biaxially oriented polypropylene film to be metallized, excellent in film formability, high in stiffness, and excellent in the adhesiveness to a metallic film and likely to have excellent metallic gloss after metallization, and a metallized biaxially oriented polypropylene film excellent in gas barrier properties and also excellent in heat resistance and stiffness, hence also excellent in the gas barrier properties after processing such as lamination. The present invention also relates to a laminate for packaging using said film. Furthermore, it relates to a metallized biaxially oriented polypropylene film excellent in the adhesiveness between the thin metallic film and the base material, hence free from the disadvantage called pick-off that the thin metallic film is transferred to the side opposite to the metallized side even though the side opposite to the metallized side is excellent in adhesiveness and heat sealability.

2. Description of the Related Arts

Biaxially oriented polypropylene (BOPP) films are widely used as films for packaging, since they are excellent in moisture barrier properties, strength, clarity and surface gloss, and it is also widely practiced to metallize them by a metal such as aluminum, for the purposes of making them look better because of the metallic gloss when displayed, improving the gas barrier properties, and inhibiting the deterioration of the packaged product otherwise caused by external light such as ultraviolet light.

However, since the surface of a BOPP film is inactive, it is generally practiced to activate the surface by such treatment as corona discharge treatment or flame treatment, for improving the adhesiveness between the metallic film and the base material film at the time of metallization.

To improve the effect of corona discharge treatment, U.S. Pat. No. 4,297,187 discloses corona discharge treatment in a mixed gas consisting of nitrogen and carbon dioxide. However, in the corona discharge treatment method, a higher treatment intensity can activate the surface more and improves the adhesive strength between the metallic film and the surface layer of the base material film, but it is known that, at the same time, the base material is deteriorated and therefore that the surface layer of the base material film is likely to be delaminted from the inside of the base material film. So, there is a limit in the effect of improving the adhesive strength. Furthermore, it is also known that if the treatment intensity is raised too much, blocking is likely to be caused.

U.S. Pat. No. 4,345,005 discloses a metallized BOPP film obtained by forming an ethylene-propylene copolymer resin layer containing about 2% to 4% of ethylene at least on one side of a base layer made of isotactic polypropylene resin by co-extrusion, treating the resin layer by corona discharge, and metallizing it.

Furthermore, U.S. Pat. No. 4,357,383 discloses a metallized multi-layer film for packaging, in which a metal layer is formed on a random copolymer layer consisting of ethylene and 0.25 to 15 wt. % of an α-olefin with 3 to 6 carbon atoms formed on a base layer. Similarly as a biaxially oriented polypropylene conjugated film to be metallized by a metal oxide, Japanese Patent Laid-Open (Kokai) No. 9-94929 discloses a film in which the heat of crystal fusion of the polyolefin resin formed as the surface layer to be metallized is 30 to 85 J/g, and proposes polypropylene copolymers, syndiotactic polypropylene resin, ethylene-a-olefin copolymers, blends consisting of any of these resins and isotactic homopolypropylene or propylene copolymer, as the resins satisfying the condition.

Moreover, Japanese Patent Laid-Open (Kokai) Nos. 6-67285 and 6-126281 disclose that the surface layer to be metallized is formed by syndiotactic polypropylene or a mixed resin consisting of syndiotactic polypropylene and isotactic polypropylene.

Of these surface layer resins, if a copolymer resin is laminated as a surface layer, the adhesiveness between the metallic film and the surface layer resin can be improved. However, since a copolymer resin is generally low in melting point, for example, it sticks to longitudinal stretching rolls at the time of film formation, to significantly restrict film formation, and the decline of gloss by sticking marks also poses a problem. Furthermore, because of the low melting point, if the film is metallized, the heat of metal condensation and the radiation heat from the evaporation source are likely to whiten the metallic film, to pose a problem that it is difficult to obtain the intended metallic gloss. Similarly, if the surface layer is formed by syndiotactic polypropylene, it is known that the melting temperature declines as stated in Japanese Laid-Open (Kokai) No. 7-89022, to pose a problem of heat resistance as in the case of copolymer resins.

U.S. Pat. No. 4,419,410 discloses a technique for an oriented polypropylene film with relatively low stereoregularity polypropylene laminated on high stereoregularity polypropylene to promote the manifestation of an organic slip agent and an anti-static agent. However, as described in said US Patent No. 4,345,005 and Japanese Patent Publication (Kokoku) No.8-18404, it is known that particularly the organic slip agent added as one of these additives worsens the adhesiveness to the metallic film, and the technique cannot be applied for a BOPP film to be metallized.

U.S. Pat. No. 4,888,237 discloses a film obtained by applying flame treatment to a surface layer containing at least 50 wt. % of an isotactic homopolymer of not more than 10 wt. % in xylene soluble content and metallizing the surface layer. The isotactic homopolymer is ordinary propylene homopolymer with an isotacticity of substantially not more than 6%, and it is stated to the effect that in the case of propylene homopolymer with an isotacticity of 6% to 15%, it is preferable to contain it up to 50%. It is disclosed that the use of such a polymer in combination with flame treatment greatly improves the adhesiveness.

However, it is stated that corona discharge treatment does not show any effect of improving the adhesiveness, and there has been no surface layer resin which can be improved in adhesiveness even by simple corona discharge treatment.

Important properties of a metallized BOPP film using said base material include the gas barrier properties to prevent the deterioration of the packaged product otherwise caused by oxygen and water vapor in the use of it as one of packaging materials, by metallization to lower the oxygen transmission rate and water vapor transmission rate. Since the gas barrier properties greatly affect the shelf life of food as a main packaged product, a metallized BOPP film with higher gas barrier properties is being demanded.

Metallized polypropylene films obtained by using low melting point resin laminated polypropylene films as prior arts have a problem that when the metallized side and another material (such as a printed BOPP film or biaxially oriented polyester film) are bonded to each other for lamination, using extruded polyethylene, etc., the low melting point resin makes the metallic film lose its metallic gloss or greatly lowers the gas barrier properties disadvantageously.

The metallized BOPP films are, for example, used in the following ways. The film is coated with an adhesive on the portions to be sealed, on the side opposite to the metallized side for cold seal pouch making. As another method, polyethylene or polypropylene is melt-extruded for bonding, or a cast polypropylene film is bonded using an adhesive, and the bonded layer is used for heat seal pouch making. In these cases, the adhesiveness of the side opposite to the metallized side is important, and for the adhesiveness, it is preferable that the wetting tension on the opposite side is higher. However, if the wetting tension is too high, the thin metallic film is transferred onto the adhesive back side when the metallized film is wound as a roll, and this phenomenon called pick-off is not preferable in view of appearance and greatly lowers the gas barrier properties disadvantageously. So, it has been practiced to laminate an ethylene-propylene block copolymer layer or a layer containing inorganic particles on the side opposite to the metallized side for highly roughening the surface as a means for decreasing the pick-off. However, even these methods have a problem that if the wetting tension of the back side is too high, the problem of pick-off arises.

Furthermore, as another application of metallized BOPP films, it is practiced to laminate a polyolefin resin on the side opposite to the metallized side, for securing heat sealability. However, the metallized BOPP film using a low melting point resin layer of any prior art still cannot overcome the phenomenon of pick-up that the thin metal layer is transferred onto the heat sealable layer on the back side.

SUMMARY OF THE INVENTION

An object of the present invention is to provide a BOPP film to be metallized which retains the excellent stiffness of BOPP and satisfies the two contradictory properties remaining unsolved in the above mentioned conventional metallized BOPP films, that is, higher adhesiveness between the metallic film and the base material of the BOPP film and excellent gloss of the metallized film.

Another object of the present invention is to provide a metallized BOPP film not available with the prior art, which is excellent in gas barrier properties and also excellent in stiffness and heat resistance, hence excellent in the gas barrier properties after lamination.

A further other object of the present invention is to provide a metallized BOPP film not available with the prior art, which is excellent in gas barrier properties and excellent in the adhesiveness between the thin metallic film and the base material, hence free from the disadvantage called pick-off that the thin metallic film is transferred to the side opposite to the metallized side even though the side opposite to the metallized side is excellent in adhesiveness and heat sealability.

The inventors found that though the low heat of crystal fusion of the surface layer resin in the prior art contributes to adhesiveness, the poor heat resistance causes various disadvantages, that the pick-off phenomenon occurs in the relation between the adhesiveness between the thin metallic film and the base material and the adhesiveness of the back side, i.e., in relation with the wetting tension of the back side and the properties of the heat sealable resin, in other words, that if the adhesiveness between the thin metallic film and the base material is poor, the pick-up is easily caused depending on the properties of the back side.

The present invention provides a biaxially oriented polypropylene film to be metallized, comprising a surface layer made of a polypropylene resin with the endothermic main peak by crystal fusion in a range of 155 to 163° C. and with a heat of crystal fusion of 20 to 90 J/g, being laminated at least on one side of the base layer made of isotactic polypropylene; and the wetting tension of the surface layer, being 33 to 55 mN/m.

The present invention also provides a metallized BOPP film, comprising a surface layer made of a polypropylene resin with the endothermic main peak by crystal fusion in a range of 155 to 163° C. and with a heat of crystal fusion of 20 to 90 J/g, being laminated at least on one side of the base layer made of isotactic polypropylene; a thin metallic film with an optical density of 1.6 or more, being laminated on the surface layer; and the adhesive strength between the surface layer and the thin metallic film, being 40 g/cm or more.

The present invention also provides a metallized BOPP film, comprising a surface layer made of a polypropylene resin with the endothermic main peak by crystal fusion in a range of 155 to 163° C. and with a heat of crystal fusion of 20 to 90 J/g, being laminated at least on one side of the base layer made of isotactic polypropylene; a thin metallic film with an optical density of 1.6 or more, being laminated on the surface layer; and the wetting tension of the side opposite to the side with the thin metallic film laminated, being 37 mN/m or more.

The present invention also provides a metallized BOPP film, comprising a surface layer made of a polypropylene resin with the endothermic main peak by crystal fusion in a range of 155 to 163° C. and with a heat of crystal fusion of 20 to 90 J/g, being laminated at least on one side of the base layer made of isotactic polypropylene; a thin metallic film with an optical density of 1.6 or more, being laminated on the surface layer; and a polyolefin resin with a crystalline melting temperature of 140° C. or lower, being laminated on the side opposite to the side with the thin metallic film laminated.

Furthermore, the present invention provides various laminates using these metallized BOPP films.

DETAILED DESCRIPTION OF THE INVENTION

The resin used to form the base layer of the present invention is crystalline isotactic polypropylene resin.

It is preferable that the mesopentad fraction of the isotactic polypropylene resin is 88% or more. The mesopentad fraction refers to the rate of isotactic conformation in the entire conformation, and is measured by $^{13}$C-NMR. If the mesopentad fraction is less than 88%, the BOPP becomes low in stiffness, and becomes poor in lamination capability. A more preferable mesopentad fraction is 90% or more.

Furthermore, it is preferable that the isotacticity of the isotactic polypropylene resin used as the base layer is 85% or more. The isotacticity refers to the rate by weight of the non-dissolved amount when the polypropylene is extracted with boiled n-heptane. If the isotacticity is less than 85%, the amount dissolved by such a solvent as xylene or n-hexane becomes too large, and the film may be unsuitable as a film for packaging. It is more preferable that the isotacticity of the isotactic polypropylene resin used as the base layer is 88% or more. Further more preferable is 90% or more. Moreover, it is preferable in view of film formability that the melt flow index (MFI) of the polypropylene resin is 1 to 10 g/10 min. A more preferable range is 2.5 to 6 g/10 min.

As the resin used as the base layer, isotactic polypropylene resin only is preferable. Depending on the purpose, a polypropylene copolymer resin may be laminated on the base layer, and if the copolymer resin is recycled for reuse in the base layer, the copolymer resin may also be contained as far as the object of the present invention is not impaired.

The surface layer resin laminated at least on one side of the base layer is a polypropylene resin with the endothermic main peak by crystal fusion in a range of 155 to 163° C. and with a heat of crystal fusion of 20 to 90 J/g.

An important point of the present invention is that the endothermic peak temperature by crystal fusion of the polypropylene resin used as the surface layer is relatively high, and it is important that the endothermic main peak by crystal fusion of the polypropylene resin used as the surface layer of the present invention is 155 to 163° C.

In the present invention, this main peak refers to a single peak when only one endothermic peak is observed, or a peak with an area accounting for not less than ⅔ of the total area of all the peaks when a plurality of endothermic peaks are observed.

The upper limit of the endothermic peak temperature by crystal fusion is specified as the characteristic value peculiar to polypropylene, but the lower limit of the peak temperature by crystal fusion greatly affects the film formability of the BOPP film to be metallized and the heat resistance at the time of metallization. If the peak temperature by crystal fusion is too low, the stickiness to the rolls at the time of film formation and the decline of metallic gloss after metallization may be caused as in the prior art. Furthermore, the low peak temperature also greatly affects the heat resistance of the metallized BOPP film, and the heat resistance at the time of lamination may also be lowered. It is preferable that the endothermic main peak by crystal fusion of the polypropylene resin used as the surface layer of the present invention is 157 to 162° C. A more preferable range is 158 to 162° C. If a secondary peak is observed at lower than 155° C., it is preferable that the peak is 140° C. or higher.

Furthermore, in view of BOPP film formability, heat resistance at the time of metallization and the heat resistance when the metallized BOPP film is laminated, it is preferable that all the endothermic peaks by crystal fusion of the polypropylene resin used as the surface layer of the present invention are in a range of 155 to 163° C.

The heat of crystal fusion of the polypropylene resin used as the surface layer of the present invention must be 20 to 90 J/g. While ordinary isotactic polypropylene resin has heat of crystal fusion of 100 J/g or more, the heat of crystal fusion of the polypropylene resin used as the surface layer resin of the present invention is characteristically small. If the crystal fusion heat is too large, the adhesiveness to the metallic film becomes poor. If the crystal fusion heat is too small, the heat resistance at the time of metallization is poor. It is preferable that the heat of crystal fusion of the polypropylene resin used as the surface layer of the present invention is 30 to 85 J/g. A more preferable range is 40 to 85 J/g.

To keep the endothermic main peak by crystal fusion and the heat of crystal fusion of the polypropylene resin used as the surface layer within the ranges of the present invention, the selection of the resin is important. In the case of a polypropylene copolymer resin alone as in the prior art, for example, in the case of ethylene-propylene random copolymer, the crystal fusion heat declines with the copolymerized ethylene content. However, since the melting temperature sharply declines simultaneously, it is difficult to satisfy the range of the present invention. However, depending on polymerization conditions, the range of the present invention can be satisfied, and the present invention does not exclude the use of a polypropylene copolymer resin alone.

In the present invention, a suitable surface layer resin is mainly composed of isotactic polypropylene resin with a mesopentad fraction of 60 to 88%. A resin obtained by mixing a polypropylene copolymer resin with the endothermic peak by crystal fusion kept in a range of 140 to 163° C. to isotactic polypropylene resin with a mesopentad fraction of 60 to 88%, up to ⅓ by weight can also be preferably used. Furthermore, a surface layer resin preferable in the present invention is a mixture consisting of isotactic polypropylene resin with a mesopentad fraction of 60 to 88% and a polypropylene copolymer resin with the endothermic peak by crystal fusion kept in a range of 155 to 163° C. The most preferable resin is isotactic polypropylene with a mesopentad fraction of 60 to 88% alone.

If the mesopentad fraction is less than 60%, the surface gloss cannot be obtained probably because the rubber component of the resin increases, and the film may be whitened since the heat resistance at the time of metallization is poor. If the mesopentad fraction exceeds 88%, the adhesiveness to the metallic film may be poor. It is more preferable that the mesopentad fraction of the isotactic polypropylene used as the surface layer resin of the present invention is 65 to 85%. The most preferable range is 68 to 83%. The intended mesopentad fraction can be achieved by selecting the isotactic polypropylene with the intended mesopentad fraction of the present invention or mixing two or more kinds of isotactic polypropylene resin different in mesopentad fraction.

It is preferable in view of film formability and solvent resistance that the molecular weight distribution ratio Mw/Mn of the isotactic polypropylene is 2 to 6. A more preferable range is 2.3 to 5, and the most preferable range is 2.4 to 4.

It is preferable in view of the capability to laminate on the base layer that the MFI of the polypropylene resin used as the surface layer resin of the present invention is 1 to 20 g/10 min.

It is preferable that the thickness of the surface layer of the present invention is 0.25 μm or more and not more than one half of the thickness of the base layer. If the thickness of the surface layer is less than 0.25 μm, it is difficult to achieve uniform lamination due to film breaking, etc., and the effect of improving the adhesiveness may be diminished. If the thickness is too large, the contribution of the surface layer to the mechanical properties becomes so large as to lower the Young's modulus, and the BOPP film to be metallized is likely to be elongated in relation with tension, and may become poor in lamination capability. It is preferable that the Young's modulus of the BOPP film to be metallized of the present invention in the machine direction is 1.3 GP or more. More preferable is 1.5 GPa or more.

It is preferable for the adhesiveness to the metallic film not to add any organic slip agent such as a fatty acid amide to the surface layer resin of the present invention, but it is allowed to add a small amount of organic crosslinked particles or inorganic particles for giving slipperiness to improve working convenience and windability. The organic crosslinked particles include crosslinked silicone particles or crosslinked polymethyl methacrylate particles, etc., and the inorganic particles include particles of zeolite, calcium carbonate, silicon oxide or calcium phosphate, etc.

The surface roughness of the surface layer in the BOPP film to be metallized of the present invention is not especially limited, but it is preferable that the center line surface roughness (Ra) is 0.03 to 0.3 μm. A more preferable range is 0.05 to 0.2 μm. If Ra is too small, slipperiness is poor, and windability may become poor. If Ra is too large, the gloss after metallization may be poor.

It is preferable for the beauty of metallic gloss after metallization that the surface gloss of the BOPP film to be metallized of the present invention is 135% or more. More preferable is 138% or more.

It is preferable for the stronger adhesiveness to the metallic film that at least one or more resins selected from petroleum resins substantially free from polar groups and terpene resins substantially free from polar groups are added up to 20 parts by weight per 100 parts by weight of the surface layer resin. If the amount of the resin added exceeds 20 parts by weight, slipperiness is lowered, and such problems as blocking may be caused.

A petroleum resin substantially free from polar groups refers to a petroleum resin substantially free from polar groups such as hydroxyl groups (—OH), carboxyl groups (—COOH), sulfonate groups (—$SO_3$Y, where Y stands for H or Na, etc.), etc. and their modified groups, i.e., a resin directly mainly produced from a petroleum unsaturated hydrocarbon such as a cyclopentadiene or higher olefin hydrocarbon.

When such a resin is added to the surface layer resin in the present invention, it is preferable that the glass transition temperature of the added resin measured by differential scanning calorimetry is 50° C. or higher, for maintaining the heat resistance of the surface layer resin. More preferable is 76° C. or higher. Furthermore, a hydrogenated petroleum resin with a hydrogenation rate of 80% or more, preferably 95% or more obtained by adding hydrogen to any of said petroleum resins is especially preferable. Moreover, in view of compatibility with the polypropylene resin in the surface layer, it is preferable that the petroleum resin is amorphous (a state that crystal fusion is not substantially observed when the petroleum resin is measured using differential scanning calorimetry), and it is preferable that the number average molecular weight of the resin is 1000 or less.

A terpene resin substantially free from polar groups refers to a terpene resin substantially free from polar groups such as hydroxyl groups (—OH), aldehyde groups (—CHO), ketone groups (—COOH), halogen groups, sulfonate groups (—$SO_3$Y, where Y stands for H or Na, etc.), and their modified groups, that is, a hydrocarbon with a composition of ($C_5H_8$)n or a modified compound derived from it. In the above formula, n stands for a natural number of about 2 to 20. Terpene resins are also called terpenoids. Typical compounds include pinene, dipentene, carene, myrcene, ocimene, limonene, terpinolene, terpinene, sabinene, tricyclene, bisabolene, zingiberene, santalene, camphorene, mirene, totarene, etc. It is desirable that the hydrogenation rate of the terpene resin is 80% or more, preferably 90% or more. Especially hydrogenated β-pinene, hydrogenated dipentene, etc. are preferable.

The BOPP film to be metallized of the present invention is treated to activate the surface layer. The surface activation treatment can be the known corona discharge treatment or flame treatment. However, corona discharge treatment is preferable since it is a simple method. The corona discharge treatment can be affected in air, nitrogen gas or a mixed gas consisting of carbon dioxide gas and nitrogen gas, etc. Among them, treatment in a mixed gas consisting of carbon dioxide gas and nitrogen gas is preferable since a higher adhesive strength to the thin metallic film can be achieved at a low treatment intensity (electric power).

After completion of surface activation treatment, the wetting tension of the surface layer must be in a range of 33 to 55 mN/m. A more preferable range is 35 to 50 mN/m. If the wetting tension is small, the adhesiveness to the metallic film is poor. If the wetting tension is too large, the base material near the surface is deteriorated to make the surface layer likely to be delaminated, lowering the adhesive strength on the contrary.

The BOPP film to be metallized of the present invention has said surface layer resin laminated at least on one side of the base layer. The base layer resin has said surface layer laminated on one side, and has a third layer laminated on the other side as required.

As the resin of the third layer, for example, a polypropylene copolymer is laminated to give heat sealability. To give slipperiness, it is preferable to laminate a polypropylene resin containing organic crosslinked particles or inorganic particles, or an ethylene-propylene block copolymer or a mixture consisting of an ethylene-propylene block copolymer and high density polyethylene, etc. The third layer on the other side is activated by corona discharge treatment, etc. as required.

The BOPP film to be metallized of the present invention can be produced by co-extruding a polypropylene resin with the endothermic main peak by crystal fusion in a range of 155 to 163° C. and with heat of crystal fusion of 20 to 90 J/g, destined to be a surface layer and isotactic polypropylene destined to be a base layer, for laminating the surface layer at least on one side of the base layer, cooling the laminate for solidification, biaxially stretching it and treating the surface layer for activation.

Co-extrusion refers to the operation to supply the resins destined to be the base layer and the surface layer and as required the resin destined to be the layer on the other side to respectively different extruders, melting them, feeding them through filter assemblies as required, joining them in a nipple or die, and extruding the laminate from a die. The die can be either a slit die or circular die. In the case of slit die, the laminate film is wound around a cooling drum, to be cooled and solidified, and sequentially or simultaneously biaxially stretched. In the case of a circular die, the laminate film is cooled by an air stream and simultaneously biaxially stretched. The stretched film is treated to activate the surface, for producing the BOPP film to be metallized of the present invention.

The metallized BOPP film of the present invention obtained by laminating a metallic film on the BOPP film to be metallized is described below.

The metallized BOPP film of the present invention is obtained by laminating a thin metallic film with an optical density of 1.6 or more on the surface layer.

The optical density is a value calculated from the optical transmittance of the metallized film by -log (optical transmittance), and if the optical density is higher, the metallic film thickness is larger. In the present invention, an optical density of 1.6 or more is necessary to manifest high gas barrier properties. More preferable is 1.8 or more. The upper limit of the optical density can be decided depending on the purpose, but in view of economy and productivity, less than 2.8 is more preferable.

The adhesive strength between the surface layer and the thin metallic film must be 40 g/cm or more. If the adhesive strength is less than 50 g/cm, the thin metallic film is likely to be peeled during processing, and furthermore, when the metallized film is used as a packaging material, the thin metallic film is likely to be delaminated from the base material to limit applicability. It is preferable that the adhesive strength between the surface layer and the thin metallic film is 60 g/cm or more. More preferable is 80 g/cm or more.

As for the gas barrier properties of the metallized BOPP film of the present invention, it is preferable that the oxygen transmission rate is 31 cc/m$^2$ 24 hours (2 cc/100 in$^2$ 24 hours) or less. More preferable is 15.5 cc/m$^2$ 24 hours or less. It is preferable that the water vapor transmission rate is 0.2 g/m$^2$ 24 hours or less. More preferable is 0.1 g/m$^2$ 24 hours or less.

Also as the gas barrier properties after lamination such as extrusion lamination, it is preferable to keep these gas barrier properties of the metallized BOPP film. It is preferable that the oxygen transmission rate is 31 cc/m$^2$ 24 hours or less and that the water vapor transmission rate is 0.2 g/m$^2$ 24 hours or less.

As a specific embodiment of the metallized BOPP film of the present invention, the wetting tension of the side opposite to the metallized side is 37 mN/m or more. If the wetting tension is less than 37 mN/m, the adhesiveness to the adhesive is insufficient. More preferable is 38 mN/m or more. A feature of the present invention is that even if the back side has such a high wetting tension, the pick-off does not occur. For further decreasing the pick-off, it is more preferable to keep the surface center line average roughness Ra of the back side at 0.2 μm.

As another specific embodiment of the metallized BOPP film of the present invention, a polyolefin resin with a crystalline melting temperature of 140° C. or lower is laminated on the side opposite to the metallized side. If the crystalline melting temperature exceeds 140° C., heat sealability becomes insufficient. A feature of the present invention is that even if a resin with such a low crystalline melting temperature is laminated on the back side, the pick-off does not occur.

The metallized BOPP film excellent in the adhesiveness to the metallic film and excellent in metallic gloss of the present invention can be obtained by metallizing the BOPP film to be metallized, by a metal such as aluminum, silver, chromium or zinc. Above all, metallization by aluminum is preferable in view of economy, sanitation and gas barrier properties.

It is preferable that the surface gloss after metallization is 700% or more as a 60° C. gloss value. More preferable is 750% or more.

The metallized BOPP film of the present invention constituted as described above can be preferably used as a part of various laminates for packaging.

Compositions of laminates using the metallized BOPP film of the present invention are described below.

The metallized BOPP film of the present invention has a printed BOPP film bonded to its metallized side using an adhesive, and is coated with a cold sealant on the sealable side opposite to the metallized side at portions requiring sealing. Instead of the printed BOPP film, printed paper may also be used.

The metallized BOPP film of the present invention has a printed BOPP film or printed paper bonded to its metallized side using an adhesive or a melt-extruded polyethylene resin, and has polypropylene or polyethylene melt-extruded to be laminated on the side opposite to the metallized side. The melt-extruded polypropylene or polyethylene is used as a heat sealable layer The metallized BOPP film of the present invention has a printed BOPP film bonded to its metallized side using a polyethylene resin and has a heat sealable layer on the other side for heat sealing. In this case, if a heat sealable layer is formed also on the printed BOPP film on the side opposite to the bonded side, a laminate heat sealable on both sides can be formed.

The metallized BOPP film of the present invention is directly printed on the metallized side, and as required further printed with a transparent material for protection of the printing, and has a heat sealable layer on the other side for heat sealing.

The metallized BOPP film of the present invention is directly printed on the metallized side, and as required further printed with a transparent material for protection of the printing, and has polypropylene or polyethylene melt-extruded to be laminated on the side opposite to the metallized side. The melt-extruded polypropylene or polyethylene is used as a heat sealable layer.

The metallized BOPP film of the present invention has a printed BOPP film bonded to its metallized side using a melt-extruded polyethylene resin, and has a cast polypropylene film bonded on the side opposite to the metallized side using an adhesive. The cast polypropylene film is used as a heat sealable layer.

Examples of the methods for producing the BOPP film to be metallized and the metallized BOPP film of the present invention are described below, but the present invention is not limited thereto or thereby.

Isotactic polypropylene resin destined to be the base layer, a polypropylene resin destined to be the surface layer and a third resin destined to be the back layer, respectively of the present invention are supplied into respectively different extruders, molten at temperatures of 230 to 290° C., fed through filter assemblies, and joined in a nipple or die, and the laminate is extruded from a slit die with the respectively intended lamination thicknesses, and wound around a metallic drum, to be cooled and solidified as a sheet, for preparing a cast laminate film. In this case, it is preferable that the temperature of the cooling drum is 30 to 60° C. for crystallizing the film. The cast laminate film is biaxially stretched to be biaxially oriented. The stretching method can be either sequential biaxial stretching or simultaneous biaxial stretching. In the case of sequential biaxial stretching, the cast film is heated to a temperature of 115 to 145° C., stretched to 4 to 7 times in the machine direction, cooled, introduced into a tenter oven, stretched to 7 to 11 times at 140 to 170° C. in the transverse direction, heatset with relaxation at 155 to 170° C., and cooled. Furthermore, it is treated by corona discharge in air, or nitrogen, or a mixed atmosphere consisting of carbon dioxide gas and nitrogen, and wound, to make a BOPP film to be metallized of the present invention. The film is installed in a continuous metallizing apparatus, and has aluminum, etc. deposited on the surface layer resin side, to make a metallized BOPP film of the present invention.

The present invention can provide a BOPP film to be metallized, which can be metallized into a metallized film with excellent gloss while the adhesiveness between the metallic film and the base material of the BOPP film is improved, and can also provide a metallized BOPP film excellent in gas barrier properties and also excellent in stiffness and heat resistance, hence excellent in the gas barrier properties after lamination.

Methods for measuring property values

The property values of the present invention were measured according to the following methods.

(1) Isotacticity (%)

A resin was extracted with 60° C. or lower n-heptane for 2 hours, to remove the additives of the polypropylene. Then, the residue was dried in vacuum at 130° C. for 2 hours. A sample of W (mg) in weight was taken from it, and extracted with boiled n-heptane in a Soxhlet extractor for 12 hours. The sample was taken out, sufficiently washed by acetone, dried in vacuum at 130° C. for 6 hours, and cooled to room temperature. The weight W' (mg) was measured, and the isotacticity was obtained from the following formula:

Isotacticity=(W'/W)×100 (%)

(2) Melt flow index (MFI: g/10 min)

Measured according to ASTM D 1238 at 230° C. and 2.16 kg.

(3) Endothermic peak temperature (°C.) by crystal fusion and heat of crystal fusion (J/g)

Five milligrams of a surface layer resin sealed in an aluminum pan was installed in thermal analyzer Model RDC220 produced by Seiko Instruments, and heated at a rate of 20° C./min, to obtain the endothermic peak temperature by crystal fusion. From the area of the endothermic peak, the heat of crystal fusion was calculated using the program contained in thermal analysis system SSC5200 produced by the same manufacturer. When the resin is a mixture and has a plurality of endothermic peaks, the sum of the respective heats of crystal fusion was adopted as the heat of crystal fusion.

(4) Mesopantad fraction (mmmm) (%)

A base material resin or a surface layer resin was dissolved in o-dichlorobenzene-D6, and $^{13}$C-NMR was measured at a resonance frequency of 67.93 MHz using JNM-GX270 produced by Nihon Denshi K. K. (JEOL). The assignment of the obtained spectrum and the calculation of mesopentad fraction were based on the T. Hayashi et al.'s method (Polymer, 29, 138~143 (1988)). For the spectrum derived from methyl groups, the respective peaks were assigned with mmmmmm peak as 21.855 ppm, and the peak area was obtained, being expressed as a percentage to the total peak area derived from methyl groups. The detailed measuring conditions were as follows.

Measuring concentration: 15~20 wt. %
Measuring solvent: o-dichlorobenzene (90 wt. %)/benzene-D6 (10 wt. %)
Measuring temperature: 120~130° C.
Resonance frequency: 67.93 MHz
Pulse width: 10 μsecond (45° pulse)
Pulse repetition time: 7.091 seconds
Datum points: 32 K
Integration times: 8168
Measurement mode: Noise de-coupling (5) Wetting tension (mN/m)

Obtained according to the JIS K 6732 method.

(6) Young's modulus (GPa)

Obtained based on ASTM D 882-64T.

(7) Surface gloss of film (%)

Obtained as 60° specular gloss based on the JIS Z 8741 method using digital variable angle gloss meter UGV-5D produced by Suga Shikenki.

(8) Surface gloss of metallized film (%)

A BOPP film to be metallized was installed in a continuous vacuum metallizing apparatus, and aluminum was evaporated from an electron beam heating evaporation source, to deposit aluminum with the optical density (-log (optical transmission)) kept in a range of 1.3 to 1.4 while continuously running the film. The surface gloss of the metallized BOPP film was obtained based on said JIS Z 8741.

(9) Adhesive strength (g/cm)

A 20 μm thick BOPP film ("Trayfan"S645 produced by Toray Industries, Inc.) was stuck to the metallized side of a metallized BOPP film using a polyurethane based adhesive, and the laminate was allowed to stand at 40° C. for 48 hours. The adhesive strength was measured by peeling the 15 mm wide laminate at a peeling rate of 10 cm/min at 90° using Tensilon produced by Toyo Baldwin.

(10) Optical density

Measured using an optical densitometer (TR927) produced by Macbeth.

(11) Oxygen transmission rate (cc/m$^2$ 24 hours)

Measured at 73° F. (22.8° C.) and 0% RH using oxygen transmission rate measuring instrument, Oxtran 2/20 produced by Modern Controls Inc.

(12) Water vapor transmission rate (g/m$^2$ 24 hours)

Measured at 100° F. (37.8° C.) and 100% RH using water vapor transmission rate measuring instrument, Permatran W3/30 produced by Modern Controls Inc.

(13) Oxygen transmission rate (cc/m$^2$ 24 hours) and water vapor transmission rate (g/m$^2$ 24 hours) after extrusion lamination A 20 μm biaxially oriented polypropylene film ("Torayfan" 2535 produced by Toray Industries, Inc.) and the metallized side of a metallized BOPP film were bonded to each other for lamination, using extruded low density polyethylene. The polyethylene resin die temperature was 320° C. and the thickness of the polyethylene resin layer was 20 μm. The oxygen transmission rate and water vapor transmission rate of the obtained BOPP film/polyethylene layer/metallized film were measured as described above.

(14) Pick-off

A metallized BOPP film was visually observed, to count the number of fine voids of the thin metallic film per an area of 1 inch×1 inch, and evaluated according to the following criterion. In the present invention, the film evaluated as ○ or Δ is acceptable.

○: 0 to 1 pc.
Δ: 1 to 5 pcs.
X: 5 or more pcs.

EXAMPLE 1

Isotactic polypropylene (isotacticity: 96%, MFI: 2.5 g/10 min, mesopentad fraction: 92%) as the base layer resin of the present invention, a mixture consisting of 80 wt. % of isotactic polypropylene (isotacticity: 86%, MFI: 2.8 g/10 min, mesopentad fraction: 74%, endothermic peak temperature by crystal fusion: 161° C., heat of crystal fusion: 77 J/g) and 20 wt. % of an ethylene-propylene random copolymer with 4.8 wt. % of copolymerized ethylene content (endothermic peak temperature by crystal fusion: 146° C., heat of crystal fusion: 63 J/g) as the surface layer resin, and an ethylene-propylene-butene copolymer (ethylene content: 1.5 wt. %, butene content: 15 wt. %, crystalline melting temperature: 133° C.) containing 0.15 wt. % of crosslinked silicone particles with an average particle size of 3 μm as a slip agent (the average particle size was measured by measuring the major axes of 100 particles observed using a field emission type scanning electron microscope (FE-SEM), and averaging them) as the heat sealable resin on the side opposite to the surface layer were supplied into respectively different extruders, melt-extruded at 270° C., fed through filter assemblies, and joined to form surface layer/base layer/heat sealable layer in a nipple, and the laminate was extruded from a slit die and wound around a metallic drum heated to 40° C., to be formed into a sheet.

The sheet was heated to 135° C., stretched to 5 times in the machine direction, cooled, introduced into a tenter oven, heated to 165° C., stretched to 9 times in the transverse direction, heatset with a relaxation rate of 10% at 165° C. in the transverse direction, and cooled. Furthermore, corona discharge treatment was effected at an intensity of 15 W minutes/m², and the film was wound. The thickness of the film consisted of surface layer/base layer/heat sealable layer: 1 μm/19 μm/2 μm. The wetting tension of the surface layer was 37 mN/m. The endothermic main peak temperature by crystal fusion of the surface layer resin was 161° C., and the heat of crystal fusion was 76 J/g.

EXAMPLES 2, 3 and 4

Films were formed and evaluated under the same conditions as in Example 1, except that any isotactic polypropylene having a mesopentad fraction, endothermic peak temperature by crystal fusion and heat of crystal fusion as shown in Table 1 was used as the surface layer resin.

EXAMPLES 5 and 6

Films were formed and evaluated under the same conditions as in Example 2, except that any isotactic polypropylene having a mesopentad fraction as shown in Table 1 was used as the surface layer resin.

EXAMPLES 7 and 8

In Example 7, a film was formed under the same conditions as in Example 2, except that the final corona discharge treatment was effected at 5 W minutes/m², and in Example 8, a film was formed under the same conditions, except that the treatment was effected in an atmosphere consisting of carbon dioxide gas (20 vol %)+nitrogen gas (80 vol %) at 50 W minutes/m². The respective wetting tensions were 34 mN/m and 52 mN/m.

EXAMPLES 9 and 10

In Example 9, a film was formed under the same conditions as in Example 2, except that the laminate consisted of surface layer/base layer/heat sealable layer: 0.5 μm/19.5 μm/2 μm, and in Example 10, a film was formed under the same conditions, except that the laminate consisted of surface layer/base layer/heat sealable layer: 2 μm/18 μm/2 μm.

EXAMPLE 11

A film was formed as described for Example 1, except that a mixture obtained by adding 10 parts by weight of a petroleum resin (Escorez 5320HC produced by Tonex) to 100 parts by weight of the isotactic polypropylene resin used in Example 2.

EXAMPLES 12 and 13

In Example 12, a film was formed under the same conditions as in Example 2, except that the laminate consisted of surface layer/base layer/heat sealable layer: 0.2 μm/19.8 μm/2 μm, and in Example 13, a film was formed under the same conditions as in Example 2, except that the laminate consisted of surface layer/base layer/heat sealable layer: 7 μm/13 μm/2 μm.

EXAMPLE 14

A film was formed under the same conditions as in Example 1, except that a mixed resin consisting of 80 wt. % of the isotactic polypropylene used in Example 2 and 20 wt. % of an ethylene-propylene random copolymer with 1.3 wt. % of copolymerized ethylene content (endothermic peak temperature by crystal fusion: 159° C., heat of crystal fusion: 101 J/g) was used as the surface layer resin. The mixed resin was 160° C. in the endothermic peak temperature by crystal fusion and 82 J/g in the heat of crystal fusion.

EXAMPLE 15

A film was formed under the same conditions as in Example 1, except that a mixed resin consisting of 80 wt. % of the isotactic polypropylene used in Example 2 and 20 wt. % of syndiotactic polypropylene (endothermic peak temperature by crystal fusion: 132° C., heat of crystal fusion: 42 J/g) was used as the surface layer resin. The mixed resin was 161° C. in the endothermic main peak temperature by crystal fusion and 70 J/g in the heat of crystal fusion.

The compositions of the above examples are shown in Table 1, and the properties of these films and metallized films are shown in Table 2.

As shown in Table 2, the BOPP films to be metallized of the present invention are characteristically high in Young's modulus, high in film surface gloss, excellent in metallic gloss after metallization and excellent in adhesive strength. As can be seen from Example 6, if the mesopentad fraction of the isotactic polypropylene used as the base layer is low, the Young's modulus tends to be low. As can be seen from Example 11, if a petroleum resin is added to the surface layer resin, the adhesiveness can be further improved preferably. As can be seen from Example 12, if the thickness of the surface layer is small, the gloss and adhesive strength may decline probably because of film breaking. As can be seen from Example 13, if the thickness of the surface layer is too large, the Young's modulus tends to decline.

TABLE 1

|  | Base layer | | | Surface layer | | | | |
|---|---|---|---|---|---|---|---|---|
|  | Resin | mmmm (%) | Thickness (μm) | Resin | mmmm of iso-PP (%) | Endothermic peak temperature by crystal fusion (° C.) | Heat of Crystal fusion (J/g) | Thickness (μm) | Wetting tension (mN/m) |
| Example 1 | iso-PP | 92 | 19 | iso-PP(80 wt %) + r-EPC(C$_2$ = 4.8%) (20 wt %) | 74 | <u>161</u>, 146 | 76 | 1 | 37 |
| Example 2 | iso-PP | 92 | 19 | iso-PP | 74 | 161 | 77 | 1 | 37 |
| Example 3 | iso-PP | 92 | 19 | iso-PP | 65 | 156 | 26 | 1 | 37 |
| Example 4 | iso-PP | 92 | 19 | iso-PP | 85 | 162 | 83 | 1 | 37 |
| Example 5 | iso-PP | 94 | 19 | iso-PP | 74 | 161 | 77 | 1 | 37 |

TABLE 1-continued

| | Base layer | | | Surface layer | | | | |
| --- | --- | --- | --- | --- | --- | --- | --- | --- |
| | Resin | mmmm (%) | Thickness (μm) | Resin | mmmm of iso-PP (%) | Endothermic peak temperature by crystal fusion (°C.) | Heat of Crystal fusion (J/g) | Thickness (μm) | Wetting tension (mN/m) |
| Example 6 | iso-PP | 87 | 19 | iso-PP | 74 | 161 | 77 | 1 | 37 |
| Example 7 | iso-PP | 92 | 19 | iso-PP | 74 | 161 | 77 | 1 | 34 |
| Example 8 | iso-PP | 92 | 19 | iso-PP | 74 | 161 | 77 | 1 | 52 |
| Example 9 | iso-PP | 92 | 19.5 | iso-PP | 74 | 161 | 77 | 0.5 | 37 |
| Example 10 | iso-PP | 92 | 18 | iso-PP | 74 | 161 | 77 | 2 | 37 |
| Example 11 | iso-PP | 92 | 19 | iso-PP (100 parts by weight) + petroleum resin (10 parts by weight) | 74 | 159 | 75 | 1 | 37 |
| Example 12 | iso-PP | 92 | 19.8 | iso-PP | 74 | 161 | 77 | 0.2 | 37 |
| Example 13 | iso-PP | 92 | 13 | iso-PP | 74 | 161 | 77 | 7 | 37 |
| Example 14 | iso-PP | 92 | 19 | iso-PP(80 wt %) + r-EPC(C$_2$ = 1.3%) (20 wt %) | 74 | 160 | 82 | 1 | 37 |
| Example 15 | iso-PP | 92 | 19 | iso-PP(80 wt %) + syn-PP(20 wt %) | 74 | <u>161</u>, 132 | 70 | 1 | 37 | iso-PP: Isotactic polypropylene,
r-EPC: Ethylene-propylene random copolymer,
C$_2$: copolymerized ethylene content,
syn-PP: Syndiotactic polypropylene,
Underlined temperature: Main peak temperature

TABLE 2

| | Young's modulus in machine direction (GPa) | Surface gloss of film (%) | Surface gloss of metallized film (%) | Adhesive strength (g/cm) |
| --- | --- | --- | --- | --- |
| Example 1 | 1.8 | 137 | 760 | 180 |
| Example 2 | 1.8 | 140 | 840 | 180 |
| Example 3 | 1.8 | 138 | 780 | 190 |
| Example 4 | 1.8 | 141 | 850 | 150 |
| Example 5 | 2 | 140 | 840 | 180 |
| Example 6 | 1.2 | 140 | 840 | 180 |
| Example 7 | 1.8 | 140 | 840 | 90 |
| Example 8 | 1.8 | 140 | 840 | 170 |
| Example 9 | 1.8 | 140 | 840 | 170 |
| Example 10 | 1.6 | 138 | 820 | 190 |
| Example 11 | 1.8 | 142 | 840 | 200 |
| Example 12 | 1.9 | 135 | 720 | 85 |
| Example 13 | 1.3 | 138 | 820 | 180 |
| Example 14 | 1.8 | 139 | 830 | 180 |
| Example 15 | 1.8 | 135 | 740 | 180 |

COMPARATIVE EXAMPLE 1

A film was formed under the same conditions as in Example 1, except that a mixture consisting of 30 wt. % of the isotactic polypropylene of Example 1 and 70 wt. % of an ethylene-propylene random copolymer with 4.8 wt. % of copolymerized ethylene content was used as the surface layer resin. The endothermic main peak by crystal fusion was 146° C., and the heat of crystal fusion was 74 J/g.

COMPARATIVE EXAMPLES 2 and 3

In Comparative Example 2, a film was formed under the same conditions as in Example 1, except that isotactic polypropylene of 92% in mesopentad fraction, 162° C. in melting temperature and 118 J/g in crystal fusion heat was used for the surface layer, and in Comparative Example 3, a film was formed under the same conditions except that those of the isotactic polypropylene were 58%, 154° C. and 18 J/g respectively.

COMPARATIVE EXAMPLES 4, 5 and 6

Films were formed under the same conditions as in Example 1, except that any of the ethylene-propylene random copolymers shown in Table 3 were used for the surface layer.

COMPARATIVE EXAMPLE 7

A film was formed by using a mixture consisting of 20 wt. % of the isotactic polypropylene used in Example 15 and 80 wt. % of syndiotactic polypropylene as the surface layer resin. The surface layer resin was 132° C. in the main peak temperature by crystal fusion and 49 J/g in the heat of crystal fusion.

COMPARATIVE EXAMPLES 8 and 9

In Comparative Example 8, a film was formed as described for Example 2, except that the final corona discharge treatment was not effected, and in Comparative Example 9, a film was formed in the same way, except that the treatment was effected in an atmosphere consisting of carbon dioxide gas (20 vol %)+nitrogen gas (80 vol %) at 100 W minutes/m$^2$. They were 32 mN/m and 57 mN/m respectively in wetting tension.

The compositions of the respective comparative examples are shown in Table 3, and the properties of these films and metallized films are shown in Table 4.

As shown in Table 4, the comparative examples have any problem of being insufficient in Young's modulus, insufficient in surface gloss or metallic gloss or insufficient in adhesive strength.

That is, in Comparative Examples 1 and 7, the endothermic main peak temperature by crystal fusion was low, and the film surface was roughened due to poor heat resistance, lowering the metallic gloss after metallization. In Comparative Example 2, since the heat of crystal fusion was too high, the adhesive strength was low. In Comparative Example 3, since the heat of crystal fusion was too low, the film surface was roughened, and the metallic gloss after metallization was not sufficient.

When an ethylene-propylene random copolymer was used, it was difficult to obtain the relation between the melting temperature and the crystal fusion heat intended in the present invention, and the melting temperature declined remarkably compared to the decline of crystal fusion heat. In this comparative example, it was impossible to have both high adhesiveness and high surface gloss.

From Comparative Examples 8 and 9, it can be seen that the wetting tension of the present invention is necessary for manifesting the adhesive strength, and that even if the wetting tension is too high, the adhesive strength is lowered probably because of the delamination in the base material of the film.

TABLE 3

| | Base layer | | | Surface layer | | | | |
| --- | --- | --- | --- | --- | --- | --- | --- | --- |
| | Resin | mmmm (%) | Thickness ($\mu$m) | Resin | mmmm of iso-PP (%) | Endothermic peak temperature by crystal fusion (°C.) | Heat of crystal fusion (J/g) | Thickness ($\mu$m) | Wetting tension (mN/m) |
| Comparative Example 1 | iso-PP | 92 | 19 | iso-PP (30 wt %) + | 74 | 161, <u>146</u> | 74 | 1 | 37 |
| Comparative Example 2 | iso-PP | 92 | 19 | iso-PP | 92 | 162 | 118 | 1 | 37 |
| Comparative Example 3 | iso-PP | 92 | 19 | iso-PP | 58 | 154 | 18 | 1 | 37 |
| Comparative Example 4 | iso-PP | 92 | 19 | r-EPC($C_2$ = 1.3%) | | 159 | 101 | 1 | 37 |
| Comparative Example 5 | iso-PP | 92 | 19 | r-EPC($C_2$ = 3%) | | 152 | 80 | 1 | 37 |
| Comparative Example 6 | iso-PP | 92 | 19 | r-EPC($C_2$ = 4.8%) | | 146 | 73 | 1 | 37 |
| Comparative Example 7 | iso-PP | 92 | 19 | iso-PP(20 wt %) + syn-PP(80 wt %) | 74 | 161, <u>132</u> | 49 | 1 | 37 |
| Comparative Example 8 | iso-PP | 92 | 19 | iso-PP | 74 | 161 | 77 | 1 | 32 |
| Comparative Example 9 | iso-PP | 92 | 19 | iso-PP | 74 | 161 | 77 | 1 | 57 | iso-PP: Isotactic polypropylene,
r-EPC: Ethylene-propylene random copolymer,
$C_2$: Copolymerized ethylene content,
syn-PP: Syndiotactic polypropylene,
Underlined temperature: Main peak temperature

TABLE 4

| | Young's modulus in machine direction (GPa) | Surface gloss of film (%) | Surface gloss of metallized film (%) | Adhesive strength (g/cm) |
| --- | --- | --- | --- | --- |
| Comparative Example 1 | 1.8 | 132 | 690 | 170 |
| Comparative Example 2 | 1.9 | 141 | 850 | 30 |
| Comparative Example 3 | 1.7 | 125 | 680 | 190 |
| Comparative Example 4 | 1.8 | 138 | 780 | 35 |
| Comparative Example 5 | 1.8 | 133 | 670 | 180 |
| Comparative Example 6 | 1.7 | 125 | 670 | 190 |
| Comparative Example 7 | 1.7 | 122 | 650 | 150 |
| Comparative Example 8 | 1.8 | 140 | 840 | 15 |
| Comparative Example 9 | 1.8 | 140 | 840 | 25 |

EXAMPLES 16 to 32

The BOPP films to be metallized of Examples 1 to 15 were metallized with aluminum at an optical density of 2.1 as Examples 16 to 30 respectively. The BOPP film to be metallized of Example 2 was metallized with aluminum at optical densities of 1.8 and 2.5 respectively in Examples 31 and 32.

The compositions of the metallized films in the above examples are shown in Table 5, and the properties of the metallized films and extrusion laminated films are shown in Table 6.

As shown in Tables 5 and 6, the metallized BOPP films of the present invention were excellent in adhesive strength, excellent in gas barrier properties such as oxygen and water vapor barrier properties, high in Young's modulus and excellent in the heat resistance of surface layer resin, and so the extrusion laminated films were excellent in gas barrier properties.

As can be seen from Example 21, if the mesopentad fraction of the isotactic polypropylene used as the base layer is low, the Young's modulus tends to be low, and the gas barrier properties after lamination may decline to some extent. As can be seen from Example 26, if a petroleum resin is added to the surface layer resin, the adhesiveness can be improved more preferably. As can be seen from Example 12, if the thickness of the surface layer is small, the decline of adhesive strength and gas barrier properties probably because of film breaking may be observed. As can be seen from Example 13, if the thickness of the surface layer is too large, the Young's modulus tends to be low, and the gas barrier properties after lamination may decline. As can be seen from Example 31, if the optical density is small, the gas barrier properties decline to some extent, but are still practically sufficient if the optical density is in the range specified in the present invention. In Example 32 where the optical density is high on the contrary, high gas barrier properties can be manifested.

The pick-off states of these examples were observed, and all the examples other than Examples 22 and 27 evaluated as Δ were evaluated as ○.

TABLE 5

| | Base layer | | | Surface layer | | | | | |
| --- | --- | --- | --- | --- | --- | --- | --- | --- | --- |
| | | | | | | Endothermic peak | Heat of | Thick- | | Adhesive |
| | Resin | mmmm (%) | Thickness ($\mu$m) | Resin | mmmm of iso-PP (%) | temperature by crystal fusion (° C.) | crystal fusion (J/g) | ness ($\mu$m) | Optical density | strength (g/cm) |
| Example 16 | iso-PP | 92 | 19 | iso-PP (80 wt %) r-EPC ($C_2$ = 4.8%) (20%) | 74 | <u>161</u>, 146 | 76 | 1 | 2.1 | 180 |
| Example 17 | iso-PP | 92 | 19 | iso-PP | 74 | 161 | 77 | 1 | 2.1 | |
| Example 18 | iso-PP | 92 | 19 | iso-PP | 65 | 158 | 48 | 1 | 2.1 | 190 |
| Example 19 | iso-PP | 92 | 19 | iso-PP | 85 | 162 | 83 | 1 | 2.1 | 150 |
| Example 20 | iso-PP | 94 | 19 | iso-PP | 74 | 161 | 77 | 1 | 2.1 | 180 |
| Example 21 | iso-PP | 87 | 19 | iso-PP | 74 | 161 | 77 | 1 | 2.1 | 180 |
| Example 22 | iso-PP | 92 | 19 | iso-PP | 74 | 161 | 77 | 1 | 2.1 | 90 |
| Example 23 | iso-PP | 92 | 19 | iso-PP | 74 | 161 | 77 | 1 | 2.1 | 170 |
| Example 24 | iso-PP | 92 | 19.5 | iso-PP | 74 | 161 | 77 | 0.5 | 2.1 | 170 |
| Example 25 | iso-PP | 92 | 18 | iso-PP | 74 | 161 | 77 | 2 | 2.1 | 190 |
| Example 26 | iso-PP | 92 | 19 | iso-PP (100 parts by weigth ) + petroleum resin (10 parts by weight) | 74 | 159 | 75 | 1 | 2.1 | 200 |
| Example 27 | iso-PP | 92 | 19.8 | iso-PP | 74 | 161 | 77 | 0.2 | 2.1 | 85 |
| Example 28 | iso-PP | 92 | 13 | iso-PP | 74 | 161 | 77 | 7 | 2.1 | 180 |
| Example 29 | iso-PP | 92 | 19 | iso-PP (80 wt %) r-EPc ($C_2$ = 1.3%) (20%) | 74 | 160 | 82 | 1 | 2.1 | 180 |
| Example 30 | iso-PP | 92 | 19 | iso-PP (80 wt %) + syn-PP (20%) | 74 | <u>161</u>, 132 | 70 | 1 | 2.1 | 180 |

TABLE 5-continued

| | Base layer | | | Surface layer | | | | | Adhesive |
| | | | | | Endothermic peak | Heat of | Thick- | | |
| | Resin | mmmm (%) | Thickness (μm) | Resin | mmmm of iso-PP (%) | temperature by crystal fusion (° C.) | crystal fusion (J/g) | ness (μm) | Optical density | strength (g/cm) |
|---|---|---|---|---|---|---|---|---|---|---|
| Example 31 | iso-PP | 92 | 19 | iso-PP | 74 | 161 | 77 | 1 | 1.8 | 180 |
| Example 32 | iso-PP | 92 | 19 | iso-PP | 74 | 161 | 77 | 2.5 | 180 | | iso-PP: Isotactic polypropylene,
r-EPC: Ethylene-propylene random copolymer,
$C_2$: Copolymerized ethylene content,
syn-PP: Syndiotactic polypropylene,
Underlined temperature: Main peak temperature

TABLE 6

| | | Gas barrier properties of metallized film | | Gas barrier properties after extrusion lamination | |
|---|---|---|---|---|---|
| | Young's modulus in machine direction (GPa) | Oxygen transmission rate (cc/m² 24 hours) | Water vapor transmission rate (g/m² 24 hours) | Oxygen transmission rate (cc/m² 24 hours) | Water vapor transmission rate (g/m² 24 hours) |
| Example 16 | 1.8 | 8.1 | 0.07 | 10.6 | 0.11 |
| Example 17 | 1.8 | 8.3 | 0.08 | 8 | 0.06 |
| Example 18 | 1.8 | 6.5 | 0.07 | 8.3 | 0.09 |
| Example 19 | 1.8 | 9.5 | 0.09 | 9.1 | 0.08 |
| Example 20 | 2 | 8 | 0.08 | 7.5 | 0.07 |
| Example 21 | 1.2 | 11.5 | 0.1 | 15.2 | 0.13 |
| Example 22 | 1.8 | 10.3 | 0.1 | 18.4 | 0.19 |
| Example 23 | 1.8 | 7.2 | 0.07 | 6.8 | 0.07 |
| Example 24 | 1.8 | 8.4 | 0.08 | 8.2 | 0.07 |
| Example 25 | 1.6 | 7.8 | 0.08 | 7.5 | 0.07 |
| Example 26 | 1.8 | 12.5 | 0.11 | 11.6 | 0.1 |
| Example 27 | 1.9 | 20.1 | 0.15 | 19.2 | 0.13 |
| Example 28 | 1.3 | 7.2 | 0.07 | 16.9 | 0.15 |
| Example 29 | 1.8 | 8.5 | 0.08 | 8.2 | 0.07 |
| Example 30 | 1.8 | 6.7 | 0.06 | 9.2 | 0.15 |
| Example 31 | 1.8 | 15.7 | 0.14 | 13.6 | 0.13 |
| Example 32 | 1.8 | 5.9 | 0.05 | 5.1 | 0.04 |

COMPARATIVE EXAMPLES 10 to 19

The BOPP films to be metallized of Comparative Examples 1 to 9 were metallized with aluminum at an optical density of 2.1 in Comparative Examples 10 to 18 respectively, and the BOPP film to be metallized of Example 2 was metallized with aluminum at an optical density of 1.4 in Comparative Example 19.

The compositions of the metallized films of these comparative examples are shown in Table 7, and the properties of the metallized films and extrusion laminated films are shown in Table 8.

As shown in Tables 7 and 8, these comparative examples have any problem of being insufficient in adhesiveness, insufficient in gas barrier properties, or very low in the gas barrier properties after extrusion lamination though sufficient in gas barrier properties after metallization.

That is, in Comparative Examples 10 and 16, since the endothermic main peak temperature by crystal fusion was too low, the gas barrier properties after lamination were poor. In Comparative Example 11, since the heat of crystal fusion was too high, the adhesive strength was low, and the gas barrier properties were also insufficient. In Comparative Example 12, since the heat of crystal fusion was too low, the gas barrier properties after extrusion lamination remarkably declined. When an ethylene-propylene copolymer was used, it was difficult to obtain the relation between the endothermic peak temperature by crystal fusion and the heat of crystal fusion of the present invention, and the endothermic peak temperature by crystal fusion declined remarkably compared to the decline of heat of crystal fusion. The gas barrier properties achieved in this comparative example were insufficient. From Comparative Example 17, it can be seen that if the adhesive strength is low, the gas barrier properties are poor, and that if the apparent adhesive strength is low, the gas barrier properties after lamination are very poor though the adhesive strength after metallization is excellent.

The pick-up states of these comparative examples were observed, and Comparative Examples 11, 13, 17 and 18 caused pick-off, being evaluated as x, Comparative Example 16, as Δ and the other comparative examples, as ○.

TABLE 7

| | Base layer | | | Surface layer | | | | | Adhesive strength (g/cm) |
|---|---|---|---|---|---|---|---|---|---|
| | Resin | mmmm (%) | Thickness (μm) | Resin | mmmm of iso-PP (%) | Endothermic peak temperature by crystal fusion (°C.) | Heat of crystal fusion (J/g) | Thickness (μm) | Optical density | |
| Comparative Example 10 | iso-PP | 92 | 19 | iso-PP (20 wt %) + r-EPC (C$_2$ = 4.8%) (80 wt %) | 74 | 161, <u>146</u> | 74 | 1 | 2.1 | 160 |
| Comparative Example 11 | iso-PP | 92 | 19 | iso-PP | 92 | 162 | 118 | 1 | 2.1 | 30 |
| Comparative Example 12 | iso-PP | 92 | 19 | iso-PP | 58 | 154 | 18 | 1 | 2.1 | 190 |
| Comparative Example 13 | iso-PP | 92 | 19 | r-EPC (C$_2$ = 1.3%) | | 159 | 101 | 1 | 2.1 | 35 |
| Comparative Example 14 | iso-PP | 92 | 19 | r-EPC (C$_2$ = 3%) | | 152 | 80 | 1 | 2.1 | 180 |
| Comparative Example 15 | iso-PP | 92 | 19 | r-EPC (C$_2$ = 4.8%) | | 146 | 73 | 1 | 2.1 | 190 |
| Comparative Example 16 | iso-PP | 92 | 19 | iso-PP (20 wt %) + syn-PP (80 wt %) | 74 | 161, <u>132</u> | 49 | 1 | 2.1 | 90 |
| Comparative Example 17 | iso-PP | 92 | 19 | iso-PP | 74 | 161 | 77 | 1 | 2.1 | 15 |
| Comparative Example 18 | iso-PP | 92 | 19 | iso-PP | 74 | 161 | 77 | 1 | 2.1 | 25 |
| Comparative Example 19 | iso-PP | 92 | 19 | iso-PP | 74 | 161 | 77 | 1 | 1.4 | 180 | iso-PP: Isotactic polypropylene,
r-EPC: Ethylene-propylene random copolymer,
C$_2$: Copolymerized ethylene content,
syn-PP: Syndiotactic polypropylene,
Underlined temperature: Main peak temperature

TABLE 8

| | | Gas barrier properties of metallized film | | Gas barrier properties after extrusion lamination | |
|---|---|---|---|---|---|
| | Young's modulus in machine direction (GPa) | Oxygen transmission rate (cc/m$^2$ 24 hours) | Water vapor transmission rate (g/m$^2$ 24 hours) | Oxygen transmission rate (cc/m$^2$ 24 hours) | Water vapor transmission rate (g/m$^2$ 24 hours) |
| Comparative Example 10 | 1.8 | 12.3 | 0.12 | 62 | 0.35 |
| Comparative Example 11 | 1.9 | 71 | 0.38 | 68 | 0.38 |
| Comparative Example 12 | 1.7 | 8.7 | 0.08 | 42 | 0.29 |
| Comparative Example 13 | 1.8 | 35 | 0.21 | 33 | 0.21 |
| Comparative Example 14 | 1.8 | 8.3 | 0.1 | 48 | 0.3 |
| Comparative Example 15 | 1.7 | 8.1 | 0.09 | 59 | 0.33 |

TABLE 8-continued

| | | Gas barrier properties of metallized film | | Gas barrier properties after extrusion lamination | |
|---|---|---|---|---|---|
| | Young's modulus in machine direction (GPa) | Oxygen transmission rate (cc/m² 24 hours) | Water vapor transmission rate (g/m² 24 hours) | Oxygen transmission rate (cc/m² 24 hours) | Water vapor transmission rate (g/m² 24 hours) |
| Comparative Example 16 | 1.7 | 19.6 | 0.15 | 82 | 0.41 |
| Comparative Example 17 | 1.8 | 215 | 1.1 | 210 | 0.9 |
| Comparative Example 18 | 1.8 | 7.5 | 0.07 | 35 | 0.21 |
| Comparative Example 19 | 1.8 | 120 | 0.5 | 115 | 0.45 |

EXAMPLE 33

A film was formed under the same conditions as in Example 1, except that the isotactic polypropylene used in Example 1 (isotacticity: 96%, MFI: 2.5 g/10 min, mesopentad fraction; 92%) containing 0.15 wt. % of crosslinked silicone particles with an average particle size of 3 μm (the average particle size was obtained by measuring the major axes of 100 particles observed using a field emission type scanning electron microscope (FE-SEM), and averaging them) as a slip agent was used as the base layer resin of the present invention. The film thickness consisted of surface layer/base layer: 1 μm/19 μm.

The obtained BOPP film was metallized with aluminum at a density of 2.1 by a continuous metallizing apparatus, to obtain a metallized BOPP film. The wetting tension of its back side was 39 mN/m.

EXAMPLE 34

A film was formed under the same conditions as in Example 1, except that isotactic polypropylene of 74% in mesopentad fraction, 161° C. in the endothermic peak temperature by crystal fusion and 77 J/g in heat of crystal fusion, and metallized for evaluation.

EXAMPLE 35

A film was formed as described for Example 1, except that a mixture obtained by adding 10 parts by weight of a petroleum resin (Escorez 5320HC produced by Tonex) to 100 parts by weight of the isotactic polypropylene resin used in Example 34, and metallized.

EXAMPLE 36

A laminate consisting of surface layer/base layer/back layer: 1 μm/17 μm/2 μm was formed and metallized under the same conditions as in Example 33, except that while the same base layer resin and the same surface resin layer as used in Example 33 were used, an ethylene-propylene block copolymer with 15 wt. % of copolymerized ethylene content was laminated on the side opposite to the surface layer. The Ra of the back side was 0.25 μm.

EXAMPLE 37

A film was formed and metallized under the same conditions as in Example 33, except that the corona discharge treatment intensity of the back side was set at 25 W minutes/m². The wetting tension of the back side was 45 mN/m.

EXAMPLE 38

A film was formed and metallized under the same conditions as in Example 35, except that the corona discharge treatment intensity of the back side was 25 W minutes/m².

EXAMPLE 39

A film was formed and metallized under the same conditions as in Example 36, except that the corona discharge treatment intensity of the back side was set at 25 W minutes/m².

COMPARATIVE EXAMPLE 20

A film was formed and evaporated under the same conditions as in Example 33, except that the surface layer resin was the same as the base material resin.

COMPARATIVE EXAMPLE 21

A film was formed and metallized under the same conditions as in Example 1, except that the corona discharge treatment of the back side was set at 10 W minutes/m² in air.

Table 9 shows the properties of these metallized BOPP films.

As shown in Table 9, the metallized BOPP films of the present invention were high in the wetting tension of the back side and excellent in adhesiveness, and yet slight in pick-off and excellent in appearance, and also excellent in gas barrier properties. For enhancing the wetting tension, it is effective to add a petroleum resin as shown in Example 38 and to make the Ra of the back side larger as shown in Example 39.

As shown in Comparative Example 20, if the heat of crystal fusion of the surface layer is large and the wetting tension of the back side is also large, then the pick-off occurs, and gas barrier properties also greatly decline. As shown in Comparative Example 21, if the wetting tension of the back side is small, the pick-off does not occur, and the gas barrier properties are also excellent. However, the adhesive strength for bonding with another material is poor.

TABLE 9

| | | Surface layer | | Heat of crystal fusion (J/g) | Back side | | Metallized film | | | |
|---|---|---|---|---|---|---|---|---|---|---|
| | Resin | mmmm of iso-PP (%) | Endothermic peak temperature by crystal fusion (° C.) | | Wetting tension (mN/m) | Ra ($\mu$m) | Optical density | Oxygen transmission rate (cc/m² 24 hours) | Pick-off | Back side adhesiveness |
| Example 33 | iso-PP(80 wt %) r-EPC(C$_2$ = 4.8%) (20%) | 74 | <u>161</u>, 146 | 76 | 39 | 0.12 | 2.1 | 8.3 | ○ | ○ |
| Example 34 | iso-PP | 74 | 161 | 77 | 39 | 0.12 | 2.1 | 8.4 | ○ | ○ |
| Example 35 | | 74 | 159 | 75 | 39 | 0.12 | 2.1 | 13 | ○ | ○ |
| Example 36 | iso-PP(80 wt %) r-EPC(C$_2$ = 4.8%) (20%) | 74 | <u>161</u>, 146 | 76 | 39 | 0.25 | 2.1 | 8.1 | ○ | ○ |
| Example 37 | iso-PP(80 wt %) r-EPC(C$_2$ = 4.8%) (20%) | 74 | <u>161</u>, 146 | 76 | 45 | 0.12 | 2.1 | 14.5 | △ | ○ |
| Example 38 | iso-PP(100 parts by weight) + Petroleum resin (10 parts by weight) | 74 | 159 | 75 | 45 | 0.12 | 2.1 | 13.2 | ○ | ○ |
| Example 39 | iso-PP(80 wt %) r-EPC(C$_2$ = 4.8%) (20%) | 74 | <u>161</u>, 146 | 76 | 45 | 0.25 | 2.1 | 8.3 | ○ | ○ |
| Comparative Example 20 | iso-PP | 92 | 162 | 118 | 39 | 0.12 | 2.1 | 71 | X | ○ |
| Comparative Example 21 | iso-PP(80 wt %) r-EPC(C$_2$ = 4.8%) (20%) | 74 | <u>161</u>, 146 | 76 | 35 | 0.12 | 2.1 | 8.3 | ○ | X | iso-PP: Isotactic polypropylene,
r-EPC: Ethylene-propylene random copolymer,
C$_2$: Copolymerized ethylene content,
Underlined temperature: Main peak temperature

EXAMPLE 40

A 15 $\mu$m thick BOPP film was bonded onto the metallized side of the metallized BOPP film of Example 34, using an adhesive, to produce a laminate. Furthermore, another laminate was produced by using paper instead of the BOPP film. Both the laminates were practically sufficient in bonding strength and also sufficient in the bonding strength of the side opposite to the metallized side to a cold sealant. They could be preferably used as pouches for food sensitive to heat such as chocolate.

EXAMPLE 41

A 15 $\mu$m thick BOPP film was bonded to the metallized side of the metallized BOPP film of Example 34 by using polyethylene melt-extruded at 320° C., to produce a laminate. Furthermore, another laminate was produced by using paper instead of the BOPP film. Both the laminates were practically sufficient in bonding strength and also sufficient in the bonding strength of the side opposite to the metallized side to a cold sealant.

EXAMPLE 42

Polyethylene was melt-extruded to the side opposite to the BOPP film bonded side of the metallized BOPP laminate of Example 41, to produce a laminate. The polyethylene layer became an excellent heat sealable layer and was sufficient also in adhesive strength. A laminate obtained by melt-extruding polypropylene instead of polyethylene could also be preferably used.

EXAMPLE 43

A 15 $\mu$m thick BOPP film was bonded to the metallized side of the metallized BOPP film of Example 17 by using polyethylene melt-extruded at 320° C., to produce a laminate. Excellent pouches which could be heat-sealed by the heat-sealable layer of the metallized BOPP laminate could be produced.

EXAMPLE 44

The metallized side of the metallized BOPP film of Example 17 and the side not provided with any heat sealable layer of a 15 $\mu$m thick BOPP film with a heat sealable layer were bonded to each other by using polyethylene melt-extruded at 320° C., to produce a laminate. Excellent pouches heat-sealable on both sides can be produced.

What is claimed is:

1. A biaxially oriented polypropylene film to be metallized, comprising a surface layer made of a polypropylene resin with the endothermic main peak by crystal fusion in a range of 155 to 163° C. and with a heat of crystal fusion of 20 to 90 J/g, being laminated at least on one side of a base layer made of isotactic polypropylene; and the wetting tension of the surface layer, being 33 to 55 mN/m.

2. A biaxially oriented polypropylene film to be metallized, according to claim 1, wherein all the endothermic peaks by crystal fusion of the polypropylene resin laminated on the base layer made of isotactic polypropylene are in a range of 155 to 163° C.

3. A biaxially oriented polypropylene film to be metallized, according to claim 1 or 2, wherein the polypropylene resin used as the surface layer is a resin mainly composed of isotactic polypropylene with a mesopentad fraction of 60 to 88%.

4. A biaxially oriented polypropylene film to be metallized, according to claim 3, wherein the polypropylene resin used as the surface layer is isotactic polypropylene with a mesopentad fraction of 60 to 88%.

5. A biaxially oriented polypropylene film to be metallized, according to claim 1 or 2, wherein the mesopentad fraction of the isotactic polypropylene used as the base layer is 88% or more.

6. A biaxially oriented polypropylene film to be metallized, according to claim 1 or 2, wherein the resin used as the surface layer is obtained by adding at least one of petroleum resins substantially not containing any polar group and terpene resins substantially not containing any polar group by up to 20 parts by weight per 100 parts by weight of the polypropylene resin.

7. A biaxially oriented polypropylene film to be metallized, according to claim 1 or 2, wherein the thickness of the surface layer is 0.25 μm or more and not more than one half of the thickness of the base layer.

8. A metallized biaxially oriented polypropylene film, comprising a surface layer made of a polypropylene resin with the endothermic main peak by crystal fusion in a range of 155 to 163° C. and with a heat of crystal fusion of 20 to 90 J/g, being laminated at least on one side of a base layer made of isotactic polypropylene; a thin metallic film with an optical density of 1.6 or more, being laminated on the surface layer; and the adhesive strength between the surface layer and the thin metallic film, being 40 g/cm or more.

9. A metallized biaxially oriented polypropylene film, comprising a surface layer made of a polypropylene resin with the endothermic main peak by crystal fusion in a range of 155 to 163° C. and with a heat of crystal fusion of 20 to 90 J/g, being laminated at least on one side of a base layer made of isotactic polypropylene; a thin metallic film with an optical density of 1.6 or more, being laminated on the surface layer; and the wetting tension of the side opposite to the side with the thin metallic film laminated, being 37 mN/m or more.

10. A metallized biaxially oriented polypropylene film, comprising a surface layer made of a polypropylene resin with the endothermic main peak by crystal fusion in a range of 155 to 163° C. and with a heat of crystal fusion of 20 to 90 J/g, being laminated at least on one side of a base layer made of isotactic polypropylene; a thin metallic film with an optical density of 1.6 or more, being laminated on the surface layer; and a polyolefin resin with a crystalline melting temperature of 140° C. or lower, being laminated on the side opposite to the side with the thin metallic film laminated.

11. A metallized biaxially oriented polypropylene film, according to any one of claims 8 to 10, wherein all the endothermic peaks by crystal fusion of the polypropylene resin laminated on the base layer made of isotactic polypropylene are in a range of 155 to 163° C.

12. A metallized biaxially oriented polypropylene film, according to any one of claims 8 to 10, wherein the polypropylene resin used as the surface layer is a resin mainly composed of isotactic polypropylene with a mesopentad fraction of 60 to 88%.

13. A metallized biaxially oriented polypropylene film, according to claim 12, wherein the polypropylene resin used as the surface layer is isotactic polypropylene with a mesopentad fraction of 60 to 88%.

14. A metallized biaxially oriented polypropylene film, according to any one of claims 8 to 10, wherein the mesopentad fraction of the isotactic polypropylene used as the base layer is 88% or more.

15. A metallized biaxially oriented polypropylene film, according to any one of claims 8 to 10, wherein the resin used as the surface layer is obtained by adding at least one of petroleum resins substantially not containing any polar group and terpene resins substantially not containing any polar group by up to 20 parts by weight per 100 parts by weight of the polypropylene resin.

16. A metallized biaxially oriented polypropylene film, according to any one of claims 8 to 10, wherein the thickness of the surface layer is 0.25 μm or more and not more than one half of the thickness of the base layer.

17. A metallized biaxially oriented polypropylene film, according to any one of claims 8 to 10, wherein the thin metallic film is a thin aluminum film.

18. A metallized biaxially oriented polypropylene film, according to claim 9, wherein a layer roughened to a surface center line average roughness Ra of 0.2 μm or more is laminated on the side opposite to the metallized layer.

19. A laminate, comprising a biaxially oriented polypropylene film or paper, being laminated on the metallized side of the metallized biaxially oriented polypropylene film of claim 9, through an adhesive.

20. A laminate, comprising a biaxially oriented polypropylene film or paper, being laminated on the metallized side of the metallized biaxially oriented polypropylene film of claim 9, through a melt-extruded polyethylene resin.

21. A laminate, comprising polypropylene or polyethylene, being laminated on the side opposite to the metallized side of the laminate of claim 19 or 20, by melt extrusion.

22. A laminate, comprising a biaxially oriented polypropylene film, being laminated on the metallized side of the metallized biaxially oriented polypropylene film of claim 11 through a melt-extruded polyethylene resin.

23. A laminate heat-sealable on both sides, comprising a heat sealable layer, being laminated on the side opposite to the biaxially oriented polypropylene film laminated side in claim 22.

* * * * *

UNITED STATES PATENT AND TRADEMARK OFFICE
CERTIFICATE OF CORRECTION

PATENT NO. : 6,190,760 B1
DATED : February 20, 2001
INVENTOR(S) : Nagai et al.

It is certified that error appears in the above-identified patent and that said Letters Patent is hereby corrected as shown below:

Column 3,
Line 5, please change "arts" to -- art --.

Column 17,
Table 3, at the subheading "Resin" at Comparative
Example 1, after "+" please insert -- r– EPC($C_2$=4.8%) (70wt%) --.

Column 22,
Table 5, continued, at Example 32, at the subheading "Adhesive strength", please insert -- 180 --.

Signed and Sealed this

Thirtieth Day of October, 2001

Attest:

NICHOLAS P. GODICI
Attesting Officer    Acting Director of the United States Patent and Trademark Office